June 22, 1943.  C. R. PATON  2,322,661
MOTOR VEHICLE
Filed July 23, 1941
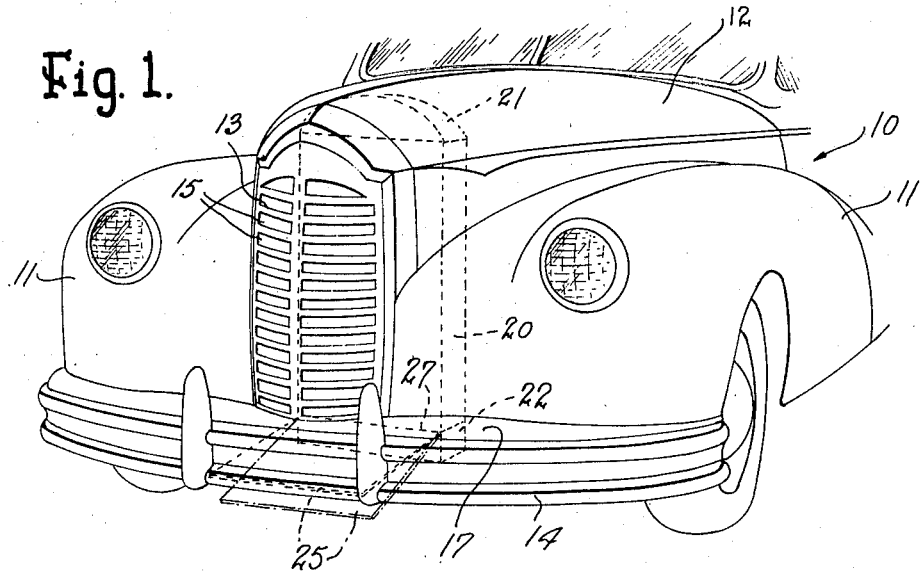
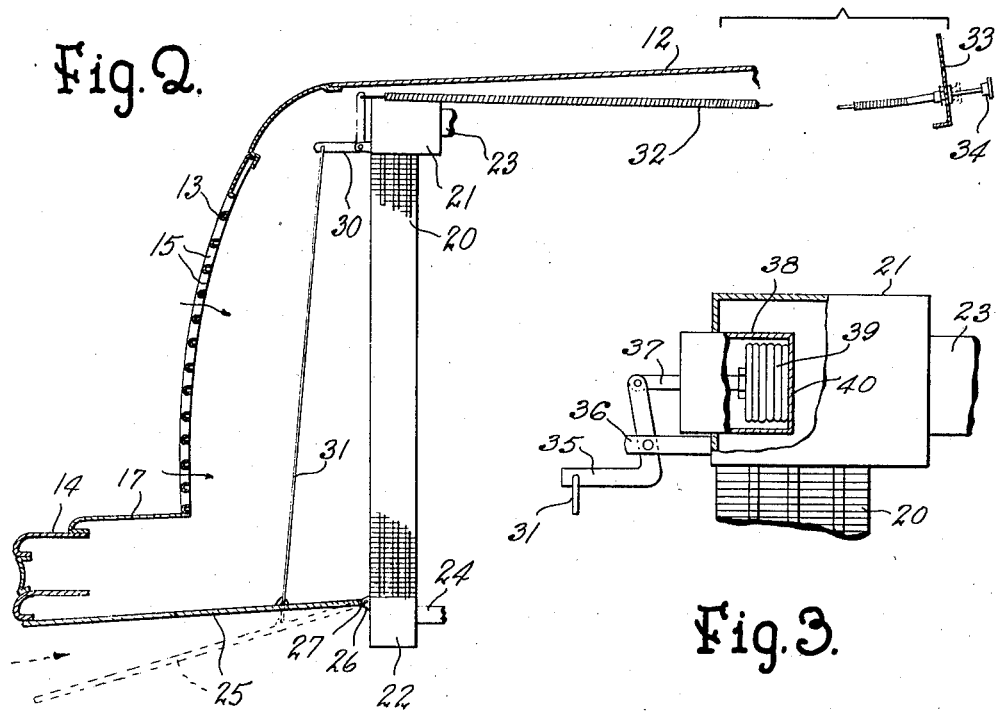
INVENTOR.
Clyde R. Paton
BY Sibbetts + Hart
Attorneys Patented June 22, 1943

2,322,661

UNITED STATES PATENT OFFICE 2,322,661

MOTOR VEHICLE

Clyde R. Paton, Birmingham, Mich., assignor to Packard Motor Car Company, Detroit, Mich., a corporation of Michigan Application July 23, 1941, Serial No. 403,710

3 Claims. (Cl. 180—54)

This invention relates to motor vehicles and more particularly to engine cooling systems.

Motor vehicle design has been directed for some time toward streamlining and, as a result, the cooling frontal area of vehicles has been materially reduced in advance of the radiator in the engine cooling system. Consequently, the space through which air can flow to the radiators, for the purpose of absorbing heat, has been restricted to such an extent that unsatisfactory heat exchange results under some operating conditions and also when high temperature is encountered.

It is an object of the invention to provide a motor vehicle with means that can be utilized at will to vary the volume of air passing in heat exchange relation with the engine cooling system.

Another object of the invention is to provide an adjustable air scoop or deflector at the forward end of a motor vehicle housing to increase air flow to the radiator of the engine cooling system.

Another object of the invention is to provide a motor vehicle with means operating automatically, in a predetermined relation with the temperature in the engine cooling system, for regulating the volume flow of an auxiliary air supply for the radiator in an engine cooling system.

Other objects of the invention will appear from the following description taken in connection with the drawing, which forms a part of this specification, and in which:

Fig. 1 is a fragmentary perspective view of the front end of a motor vehicle with which the invention is incorporated;

Fig. 2 is a longitudinal sectional view of the front end of the motor vehicle showing the air deflector and the control means therefor;

Fig. 3 is a fragmentary elevational view, partly in section, of the upper header of the radiator in an engine cooling system showing a modified actuating mechanism for the deflector.

A conventional motor vehicle is indicated by the numeral 10 and the front end housing thereof consists of a pair of fenders 11, bonnet 12, grill 13. The bottom of the housing is open and a bumper 14 extends in front of the lower portion thereof. The grill 13 is louvered and provides unrestricted openings 15 through which air can pass to the interior of the housing. A wall 17 for deflecting stones extends rearwardly from the front bumper and closes the space to the rear thereof in front of the fenders and the grill.

The front housing provides a space in which a conventional engine (not shown) is enclosed. Associated with an engine is a conventional fluid cooling system that includes a radiator 20, having an upper header 21 and a lower header 22. The radiator is installed behind the grill so that air can pass through the openings in the grill and through the radiator in the usual manner to absorb heat from engine cooling fluid passing through the radiator. The outlet conduit in the cooling system leading from the engine to the upper header is indicated at 23, and the lower conduit leading from the radiator back to the engine is indicated at 24.

The forward end of the motor vehicle so far described is conventional and, as previously related, the area in the grill through which air can pass to the radiator is restricted so that improper heat exchange results when high temperatures are developed in the cooling system under certain engine operating conditions and when high temperature atmospheric conditions are encountered. In order to overcome this inadequate heat exchange during the conditions mentioned, it is proposed to provide an auxiliary air supply for the radiator that can be brought into effect and varied in volume as desired or required.

As one means of providing this auxiliary supply of air to the radiator a deflector or scoop, in the form of a movable wall 25, is arranged beneath the front end of the housing 12 and preferably extends from the bottom of the bumper to the lower radiator header. This adjustable wall can be formed of sheet metal and it can be pivoted at its rear end so that the forward end can be swung up or down. One means of supporting the deflector is to provide a plurality of brackets as indicated at 26 on the lower radiator header to which the rear end of the deflector can be pivoted by suitable pins 27. It is necessary that the deflector extend forward sufficiently to scoop in air passing beneath the front bumper. When the deflector abuts the lower edge of the front bumper then no air will be deflected to the radiator, but when the deflector is moved downwardly away from the front bumper air is directed upwardly below the stone deflector to the radiator.

The deflector can be adjusted by actuating means under control of the driver of the vehicle or under some form of automatic control that can be responsive to temperature conditions in the cooling system. In Fig. 2 a manually operating actuator means is shown. A bell crank 30 is pivoted to the upper radiator header 21 and a vertically extending connector or link rod 31 connects the lower arm of the bell crank with the deflector. A Bowden wire 32 extends across the top radiator header and is secured at one end to the upper arm of the bell crank. The other end of the Bowden wire extends through the vehicle instrument panel 33 and has a knob 34 fixed on the end thereof by means of which the vehicle driver can actuate the wire to rock the bell crank and thereby move the link rod 31 to raise and lower the deflector.

The actuating means for the deflector shown in Fig. 3 includes a bell crank 35, pivotally mounted on bracket 36 fixed on the upper header, and link rod 31 connecting the lower bell crank arm with the deflector. The upper arm of the bell crank is fixed to a rod 37 that projects from and is carried by a thermostat housing 38 in which is arranged a thermostat 39. The housing 38 is suitably mounted to extend into the upper header 21 of the radiator and the rod 37 is fixed at its inner end to the movable end of the thermostat, the other end of the thermostat is fixed to the inner wall 40 of the housing 38. The thermostat can be filled with some form of conventional heat responsive fluid that will expand the thermostat in an axial direction above some predetermined temperature condition of the fluid in the engine cooling system. Prior to expansion of the thermostat bellows 39, the deflector will be closed against the front bumper and when the thermostat expands axially it moves forwardly and rocks the bell crank to move the deflector downwardly away from the front bumper. With this form of the invention, the deflector will be controlled so that it will be closed below some predetermined temperature in the engine cooling system and above such temperature the deflector will be opened in accordance with the temperature developed in the cooling system.

This auxiliary air supply will bolster the normal air supply passing to the radiator of the engine cooling system through the grill to increase the air supply when unusually high temperatures are encountered either with atmosphere or in the cooling system so that efficient heat transfer will result.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a motor vehicle, a forward housing having louvers therein, an engine radiator in the housing behind the louvers, a bumper in advance of the housing, a stone deflector wall across the space between the bumper and the housing, an adjustable air deflector wall pivoted to the lower portion of the radiator and extending forwardly to a point beneath the lower edge of the bumper, and means operable to adjust the pivoted wall so that air will travel to the radiator in a path between the stone deflector wall and the air deflector wall.

2. In a motor vehicle, a louvered front end housing open at the bottom, a radiator in the housing behind the louvers, a bumper in front of the bottom of the housing, a wall closing the space between the bumper and the bottom of the front edge of the housing, a deflector across the space between the lower edge of the bumper and the bottom portion of the radiator, said deflector being pivoted to the lower part of the radiator and adapted to engage the lower edge of the bumper, and means operable to swing the deflector on its pivot into the air stream beneath the bumper to direct air upwardly to the radiator.

3. In a motor vehicle, a front end housing open at the bottom, a bumper around the forward lower portion of the housing, a pivoted wall extending across the bottom of the front end of the housing adapted to engage the bottom of the bumper, and means operable to swing said bottom wall away from the bumper to provide an air inlet space for the housing.

CLYDE R. PATON.